(12) United States Patent
Wirth et al.

(10) Patent No.: US 11,459,437 B1
(45) Date of Patent: Oct. 4, 2022

(54) POROUS POLYMER MONOLITHS ADAPTED FOR SAMPLE PREPARATION

(71) Applicant: Trajan Scientific Australia Pty Ltd, Ringwood (AU)

(72) Inventors: Hans-Jurgen Wirth, Ringwood (AU); Wei Boon Hon, Ringwood (AU)

(73) Assignee: Trajan Scientific Australia Pty Ltd, Ringwood (AU)

( * ) Notice: Subject to any disclaimer, the term of this patent is extended or adjusted under 35 U.S.C. 154(b) by 0 days.

(21) Appl. No.: 15/779,241

(22) PCT Filed: Nov. 28, 2016

(86) PCT No.: PCT/AU2016/051163
§ 371 (c)(1),
(2) Date: May 25, 2018

(87) PCT Pub. No.: WO2017/088032
PCT Pub. Date: Jun. 1, 2017

(30) Foreign Application Priority Data

Nov. 27, 2015  (AU) ................................ 2015904917

(51) Int. Cl.
*C08J 9/28* (2006.01)
*G01N 1/40* (2006.01)
(Continued)

(52) U.S. Cl.
CPC .......... *C08J 9/286* (2013.01); *B01D 15/325* (2013.01); *B01D 15/361* (2013.01);
(Continued)

(58) Field of Classification Search
CPC ......... B01L 3/50255; B01L 2300/0681; G01N 2001/4088; G01N 1/405; B01D 15/325;
(Continued)

(56) References Cited

U.S. PATENT DOCUMENTS 6,048,457 A * 4/2000 Kopaciewicz ......... B01D 61/00
210/321.6
2004/0138432 A1  7/2004 Viklund et al.
(Continued)

FOREIGN PATENT DOCUMENTS

JP   2014-077138 A   5/2014
WO   2011/082449 A1  7/2011
WO   2013/006904 A1  1/2013

OTHER PUBLICATIONS

Boos, K.S. et al., "Alkyl-Diol Silica (ADS): restricted access precolumn packings for direct injection and coupled-column chromatography of biofluids", Fresenius' Journal of Analytical Chemistry, 352: 684-690 (1995).
(Continued)

*Primary Examiner* — Jill A Warden
*Assistant Examiner* — Dwayne K Handy
(74) *Attorney, Agent, or Firm* — Merchant & Gould P.C.

(57) ABSTRACT

A porous polymer monolith comprises a polymer body having macroporous through-pores that facilitate fluid flow through the body and an array of mesopores adapted to bind from the fluid flow molecules of a predetermined range of sizes, wherein the surface area of the monolith is predominantly provided by the mesopores. Also disclosed is a method of making a porous polymer monolith. The method includes forming a polymer body by phase separation out of a solution containing at least a monomer, a crosslinker and a primary porogen, whereby the body contains multiple macroporous through-pores, wherein the solution further contains a secondary porogen comprising oligomers inert with respect to the monomer and cross-linker but chemically compatible with the monomer so as to form mesostructures within the polymer body during said phase separation, and washing the mesostructures from the body to provide an
(Continued)

Figure 1:
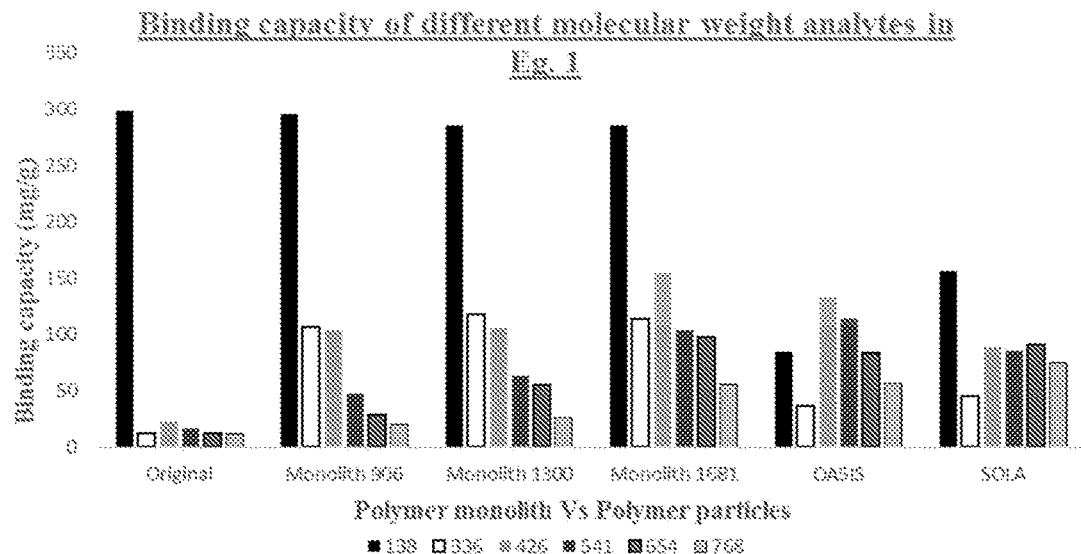

array of mesopores such that the surface area of the monolith is predominantly provided by the mesopores.

10 Claims, 2 Drawing Sheets

(51) Int. Cl.
    *C08J 9/36*         (2006.01)
    *B01J 39/20*       (2006.01)
    *B01J 41/14*       (2006.01)
    *G01N 1/10*       (2006.01)
    *B01J 20/26*       (2006.01)
    *B01J 20/285*     (2006.01)
    *B01J 20/32*       (2006.01)
    *B01D 15/38*      (2006.01)
    *B01D 15/36*      (2006.01)
    *B01D 15/32*      (2006.01)
    *B01J 47/014*     (2017.01)

(52) U.S. Cl.
    CPC ........ *B01D 15/3847* (2013.01); *B01J 20/261* (2013.01); *B01J 20/285* (2013.01); *B01J 20/3285* (2013.01); *B01J 39/20* (2013.01); *B01J 41/14* (2013.01); *B01J 47/014* (2017.01); *C08J 9/36* (2013.01); *G01N 1/10* (2013.01); *G01N 1/405* (2013.01); *C08J 2201/026* (2013.01); *C08J 2201/0543* (2013.01); *C08J 2205/048* (2013.01); *C08J 2325/06* (2013.01)

(58) Field of Classification Search
    CPC ... B01D 15/3847; B01J 20/261; B01J 20/285; C08J 9/286; C08J 2205/048; C08J 2325/06
    See application file for complete search history.

(56) References Cited

U.S. PATENT DOCUMENTS

| | | |
|---|---|---|
| 2007/0163332 A1 | 7/2007 | Tsujii et al. |
| 2009/0045119 A1 | 2/2009 | Hosoya et al. |
| 2009/0178966 A1 | 7/2009 | Nakanishi et al. |
| 2011/0290714 A1 | 12/2011 | Inoue et al. |
| 2014/0178252 A1* | 6/2014 | Hatch .................... B01J 20/267 422/69 |
| 2015/0211967 A1 | 7/2015 | Gooley et al. |

OTHER PUBLICATIONS

Van der Hoeven, R. et al., "Liquid chromatography-mass spectrometry with on-line solid-phase extraction by a restricted-access C18 precolumn for direct plasma and urine injection", Journal of Chromatography A, 762: 193-200 (1997).

Wang, Q.C. et al., "Fine Control of the Porous Structure and Chromatographic Properties of Monodisperse Macroporous Poly-(styrene-co-divinylbenzene) Beads Prepared Using Polymer Porogens", Journal Polymer Science Part A: Polymer Chemistry, 32: 2577-2588 (1994).

International Search Report and Written Opinion of the International Searching Authority for International Patent Application No. PCT/AU2016/051163 dated Feb. 6, 2017, 8 pages.

Aoki, H. et al., "Preparation of glycerol dimethacrylate-based polymer monolith with unusual porous properties achieved via viscoelastic phase separation induced by monodisperse ultra high molecular weight poly(styrene) as a porogen", Journal of Chromatography A, 1119: 66-79 (2006).

Lav, T. et al., "Porous Poly(styrene-co-divinylbenzene) Neutral Monolith: From Design and Characterization to Reversed-Phase Capillary Electrochromatography Applications", Macromolecular Chemistry and Physics, 213: 64-71 (2012).

Saba, S.A. et al., "Hierarchically Porous Polymer Monoliths by Combining Controlled Macro- and Microphase Separation", Journal of American Chemical Society, 137: 8896-8899 (2015).

Shang, P. et al., "Supermacroporous polymer monolith prepared with polymeric porogens via viscoelastic phase separation for capillary electrochromatography", Journal of Chromatography A, 1369:170-180 (2014).

Extended European Search Report for corresponding European Patent Application No. 16867464.6 dated May 23, 2019, 12 pages.

Macintyre, F. et al. "Control of Porous Morphology in Suspension Polymerized Poly(Divinylbenzene) Resins Using Oligomeric Porogens", Macromolecules, 37(20): 7628-7636 (2004).

* cited by examiner

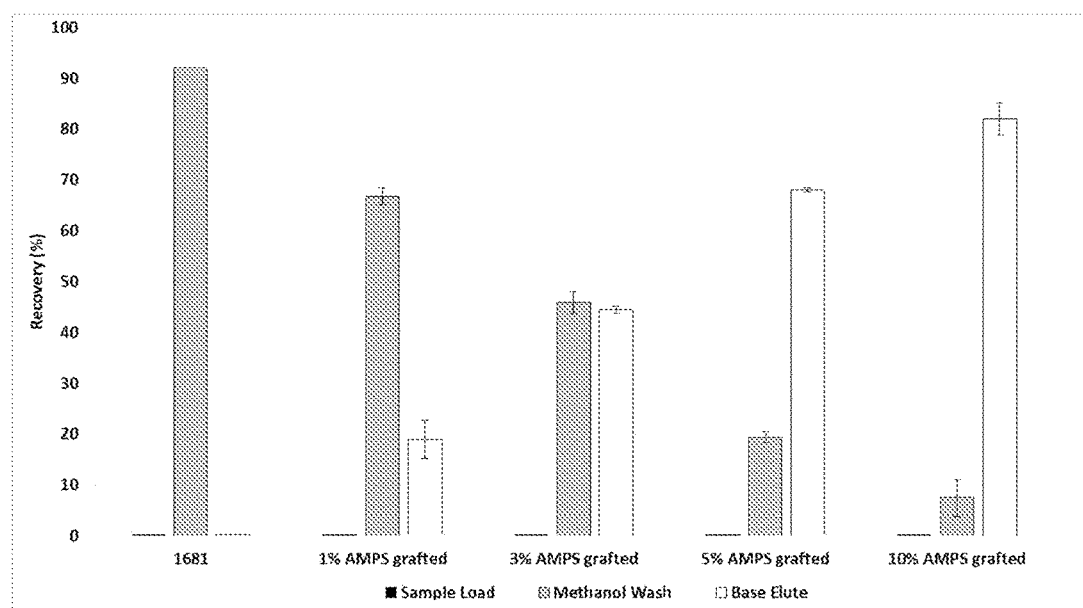
Figure 3. Extraction of amitriptyline with non-grafted and grafted monolith 1681 polymer using SCX extraction method

POROUS POLYMER MONOLITHS ADAPTED FOR SAMPLE PREPARATION

FIELD OF THE INVENTION

This invention relates generally to porous polymer monoliths, to sampling devices incorporating such monoliths, and to methods for their preparation.

CROSS REFERENCE TO RELATED APPLICATION

This application is a National Stage Application of PCT/AU2016/051163, filed on 28 Nov. 2016, which claims priority from Australian patent application no. 2015904917, filed on 27 Nov. 2015, the entire disclosures of which are incorporated herein by reference. To the extent appropriate, a claim of priority is made to each of the above disclosed applications.

BACKGROUND OF THE INVENTION

Porous polymer monoliths are a class of material having particular utility in sample preparation techniques in analytical chemistry. The conventional method of synthesis involves forming a solution by mixing one or more monomers, a crosslinker, one or more porogens, a mediator and an initiator. A commonly employed combination has styrene as a monomer, divinylbenzene (DVB) as the crosslinker, toluene as the mediator and dodecanol as the porogen. This formulation is disclosed for example, in the context of the formation of macroporous polymer beads in Ching Wang et al, Journal of Polymer Science: Part A: Polymer Chemistry 32, 2577-2588 (1994). With appropriate conditions, the mixture results in a monolith with macro through-pores and micropores with a pore size below 20 Å.

For the majority of analytes these polymer monolith materials are effectively non-porous with resulting low capacity. The principal applications for the materials involve separations of macro-molecules such as proteins. A number of attempts have been made to increase the specific surface area, including a hyper-crosslinking technique that involves filling the through-pores with an open mesh of crosslinked polymers. These methods have tended to undo some of the advantages the monolithic material had in the first place.

International patent publications WO 2011/082449 and WO 2013/006904 disclose the use of porous polymer matrix or monolith materials as media for the storage of biological fluids, including body fluids such as whole blood or blood plasma. As described therein, porous polymer monoliths are highly crosslinked structures that can function as a stationary support and consist of a fused array of micro globules separated by pores. In embodiments of particular interest, such porous polymer monoliths are formed from one or more functionalised monomers including a hydrophilic monomer such as 2-hydroxyethylmethacrylate (HEMA) and a mixture of porogens including one or more alcohols and one or more alkanes.

United States Patent Application Publication 20150211967 discloses a sampling device, such as a pipette tip or a cartridge adapted for solid phase extraction (SPE), in which the flow path includes a bed of a porous polymer monolith selected to adsorb bioparticles from a matrix drawn or dispensed through an inlet opening and the bed.

In a recent paper by Saba et al ('*Hierarchically Porous Polymer Monoliths by Combining Controlled Macro-and MicroPhase Separation*'), J. Am. Chem. Soc. 2015, 137, 8896-8899, there is described a tunable nanoporous polymer monolith based on controlled polymerisation of styrene and DVB from a poly (lactide) macro-chain transfer agent in the presence of non-reactive polyethylene oxide (PEO). Morphologies can be tailored from mesoporous, with control over mean pore size, to hierarchically meso and macro porous. The paper describes the presence of residual PEO in the cross-linked polystyrene matrix, said to improve the wettability of the monolith and thereby creating a hydrophilic rather than hydrophobic structure. Moreover, it is said that the 'structure contains isolated macropores that are accessible through a percolating mesoporous network'. This structure will be a significant inhibiter to through-flow across the monolith. It is further evident that the abovementioned tunability inherently entails an effect on the macroporous structure when varying the mean mesopore size.

Accordingly, while the Saba et al paper does propose a technique for introducing a mesoporous structure into a porous polymer monolith, the approach here taken has a number of disadvantages and does not satisfactorily overcome the problem of providing mesopores to improve binding capacities while preserving macroporous through-flow. It is an object of the invention to address this problem in an effective manner.

Reference to any prior art in the specification is not an acknowledgment or suggestion that this prior art forms part of the common general knowledge in any jurisdiction or that this prior art could reasonably be expected to be understood, regarded as relevant, and/or combined with other pieces of prior art by a skilled person in the art.

SUMMARY OF THE INVENTION

The invention entails the realisation that the introduction of a suitably compatible secondary porogen into the synthesis of porous polymer monoliths can result in the formation of an array of mesopores substantially independently of the macroporous structure. Moreover, it is possible to adapt the method to pre-select the mesopore size and thereby to achieve a tuneable analyte size cut off.

The invention accordingly provides, in a first aspect, a porous polymer monolith comprising a polymer body having macroporous through-pores that facilitate fluid flow through the body and an array of mesopores adapted to bind from the fluid flow molecules of a predetermined range of sizes, wherein the surface area of the monolith is predominantly provided by the mesopores.

By "predominantly" in this context is meant greater than 50%, preferably greater than 65%, more preferably at least 85%, most preferably at least 90%.

In a second aspect, the invention provides a method of making a porous polymer monolith comprising:
  forming a polymer body by phase separation out of a solution containing at least a monomer, a crosslinker and a primary porogen, whereby the body contains multiple macroporous through-pores, wherein the solution further contains a secondary porogen comprising oligomers inert with respect to the monomer and crosslinker but chemically compatible with the monomer so as to form mesostructures within the polymer body during said phase separation, and
  washing the mesostructures from the body to provide an array of mesopores such that the surface area of the monolith is predominantly provided by the mesopores.

By "mesopores" in the present context is meant pores of a size in the range 2-50 nm (20-500 Å). By analogy, references here to micropores are to pores of a pore size below 20 Å, and references to macropores are to a pore size greater than 500 Å.

In embodiments of the invention, the preferred mesopore size range is 40-120 Å, more preferably 50-100 Å.

The invention further provides a porous polymer monolith made by the method of the second aspect of the invention. This monolith may also be in accordance with the first aspect of the invention.

Embodiments of the Invention

In an embodiment of interest, the monomer is styrene, the crosslinker may be Divinylbenzene (DVB), and the primary porogen may be dodecanol. In this embodiment, the secondary porogen comprises low molecular weight polystyrene, ie. styrene oligomers, preferably of a molecule weight not greater than 5000, more preferably not greater than 2000. Above a molecule weight of 5000, the oligomers become less soluble in the reaction mixture. Toluene is the preferred mediator and the initiator may be azobisisobutyronitrile (AIBN) or benzoylperoxide (BPO).

Preferably, the styrene oligomers are structured, for example by lacking residual double bonds, to minimise or prevent their participation in the primary phase separation polymerisation reaction that forms the monolith body. For example, styrene oligomers obtained by cationic polymerisation do not contain any residual double bonds.

A preferred porous polystyrene monolith may have a bimodal pore size distribution with large, eg. 1 to 5, preferably 2 to 3 micron, macro through-pores and mesopores around 50-100 Å pore size. In the preferred method of the invention, these macro through-pores result from the phase separation polymerisation reaction between the styrene and the dodecanol, while these mesopores are the voids left behind following the washing from the polymer body of the secondary porogen mesostructures arising from the styrene oligomers. The washing effects dissolution and physical washing away of the secondary porogen mesostructures.

In an alternate embodiment, derived from the porous polymer monoliths disclosed in international patent publication WO 2011/082449, in which the monomer is a mix of methacrylates, and the primary porogens may be a mix of at least one alcohol and at least one alkane, a suitable secondary porogen would be a HEMA oligomer, which can e.g. be synthesised by reversible addition-fragmentation chain transfer (RAFT) polymerization. The principle is applicable to any monolithic recipe where the secondary porogen is an oligomeric form of the monolithic polymer.

Preferably, there is no or substantially no residual secondary porogen remaining in the monolith structure.

Preferably, the macro through-pores are substantially unmodified and unaffected by the addition of the secondary porogen during the formation of the polymer body.

Preferably, the mesopores contain sites, preferably hydrophobic, adapted to bind molecules of predetermined character, structure, chemistry or size.

Experiments with porous polymer monoliths according to embodiments of the invention have shown that analyte molecules small enough to penetrate the mesopore system have access to binding sites that are located inside the pore structure while the binding capacity for larger analytes drops dramatically when mesopore access is restricted due to their size. The result is a mixed mode retention mechanism where a size exclusion effect overlays the hydrophobic binding. It has been further demonstrated that the binding capacity for larger analytes increases when the size (eg in terms of monomer units or molecular weight) of the porogen increases while at the same time the binding capacity for smaller analytes remains constant. This indicates that the size of the aforementioned mesostructures derived from the secondary porogens is predictably influenced by the size of the secondary porogen oligomers.

According to a significant preferred feature of the invention, in the method of forming a porous polymer monolith according to the second aspect of the invention the pore size profile of the mesopores is predetermined by the molecular size and therefore molecular weight of the secondary porogen oligomers.

This preferred aspect of the invention can be employed to design a range of monolithic materials that have a 'tuneable' analyte size cut-off dependent on the size of porogen employed. An exemplary application is the pre-concentration of metabolites in serum. Blood serum contains a large amount of proteins which, because of their size, would only have a very limited binding capacity on the monolith (being too large to access mesopores). Metabolites on the other hand are predominantly small molecules with molecular weights below 500 and would have full access to the mesoporous interior of the monolithic phase.

As already indicated, the secondary porogen is preferably soluble in the solution containing at least a monomer, crosslinker and primary porogen. To function as required, it should predominantly remain in the solid phase during the phase separation so as to form the aforementioned mesostructures able to be washed from the polymer body.

Washing of the mesostructures from the polymer body or monolith may be effected with any solvent suitable to dissolve and wash away the mesostructures. In the aforedescribed embodiment employing styrene oligomers, a suitable such solvent would be dichloromethane.

In a preferred application, the invention further provides a sample preparation or analytic device incorporating a porous polymer monolith according to the first aspect of the invention. Of particular interest is an SPE (solid phase extraction) device such as a deep well plate or an SPE cartridge, or a device for performing the Micro SPE technique of Micro Extraction by Packed Sorbent (MEPS™).

In a further adaptation of the invention, the method of the second aspect of the invention may be carried out in situ in such a sample preparation or analytic device. For example, the porous polymer monolith may be fabricated in situ in the body of the device by electromagnetic, eg. ultraviolet, initiation. For this purpose, the solution includes an appropriate radiation responsive initiator known to those skilled in the art. A suitable reagent for ultraviolet initiation is 2,2-dimethoxy-2-phenylacetone (DMPA).

An advantage of the method of the invention is that the size that the porogen molecule dictates the exclusion limit for the analyte to which the monolith may be applied as an analyte adsorbent. By employing a smaller porogen, the monolith will now only have a high binding capacity for small molecules while all molecules above the cut-off limit have a much reduced chance to bind to the monolith. A suitable cut-off analyte molecular weight is in the range 500-600 because this will cover well over 90% of all applications in pharmaceutical, environmental and food analyses as well as metabolomic studies.

Preferably, and in accordance with known applications of porous polymer monoliths, the macro through-pores are tuned to obtain a desired flow rate when a vacuum is applied at the device outlet or low positive pressure is applied to the device inlet.

In a further embodiment the surface of the polymer monolith is grafted with PEGMA (Poly(Ethylene Glycol) Methyl ether methacrylate) to minimise the impact of the hydrophobic nature of the external surface: non-specific protein adsorption from complex matrices such as human whole blood and plasma have been shown to impact performance. PEGMA creates a hydrophilic external surface and minimises non-specific protein binding adsorption on the poly(DVB) adsorbent.

In a further embodiment, the monolith is grafted to prepare a mixed-mode ion exchange functionality. A strong cation exchange (SCX) functionality has been commonly used for the extraction of polar/non polar ionized base compounds from complex matrices such as human blood and plasma. Moreover, the sulfonate group gives a higher degree of hydrophilicity on the surface to prevent non-specific protein binding.

As used herein, except where the context requires otherwise, the term "comprise" and variations of the term, such as "comprising", "comprises" and "comprised", are not intended to exclude further additives, components, integers or steps.

EXAMPLES

Example 1

The different porous polymer monoliths (abbreviated in this example as "monoliths") constituting embodiments of the first aspect of the invention were synthesised by the process of the second aspect of the invention, using as secondary porogens, polystyrenes with respective molecular weights of 906, 1300 and 1681 respectively. To determine the optimum binding capacity and recovery of different analytes on the monoliths synthesised with the various molecular weight polystyrenes, the monoliths were probed with analytes of increasing molecular weight as follows:

| Analytes | Molecular weight (g/mol) |
| --- | --- |
| 3-nitroaniline | 138 |
| peptide $NH_2$—GGFG—COOH | 336 |
| peptide $NH_2$—GFGF—COOH | 426 |
| peptide $NH_2$—GFGGFG—COOH | 541 |
| peptide $NH_2$—GGFGGFGG—COOH | 654 |
| peptide $NH_2$—GGFGGGGFGG—COOH | 768 |

The results for the synthesised monoliths were compared to corresponding results obtained with commercially available DVB solid phase extraction devices—Oasis from the Waters Corporation and Sola from Thermo Fisher Scientific.

FIG. 1 demonstrates the increased binding capacity for the increasing molecular weight analytes on the various synthesised monoliths. The monolith designated "original" was made by the standard process with no secondary porogen. As the molecular weight of the secondary porogen was increased a corresponding increase in binding capacity was observed for the increasing molecular weights of the analytes.

Example 2

Caffeine molecular weight 194, was measured in whole human capillary blood.

A calibration curve was constructed using dilutions of 0.5 mg/mL caffeine stock solution. The following concentrations were chosen: 3.125 µg/mL, 5 µg/mL, 31.25 µg/mL and 62.5 µg/mL. Calibration analysis was carried out by High Pressure Liquid Chromatography (HPLC) under the conditions listed below and gave a correlation of $R^2=0.9993$ All caffeine concentrations were calculated comparison to the calibration curve obtained.

| LC Conditions | |
| --- | --- |
| Column: | 250 × 4.6 mm enable C18G |
| HPLC system: | Shimadzu Prominence 20A |
| Flow rate: | 1.0 ml/min |
| Mobile phase: | 16% acetonitrile with 0.1% TFA |
| Detection: | 270 nm |
| Temperature: | 25° C. |
| Sample temp: | 15° C. |
| Injection volume: | 1 µL |

Figure 2:
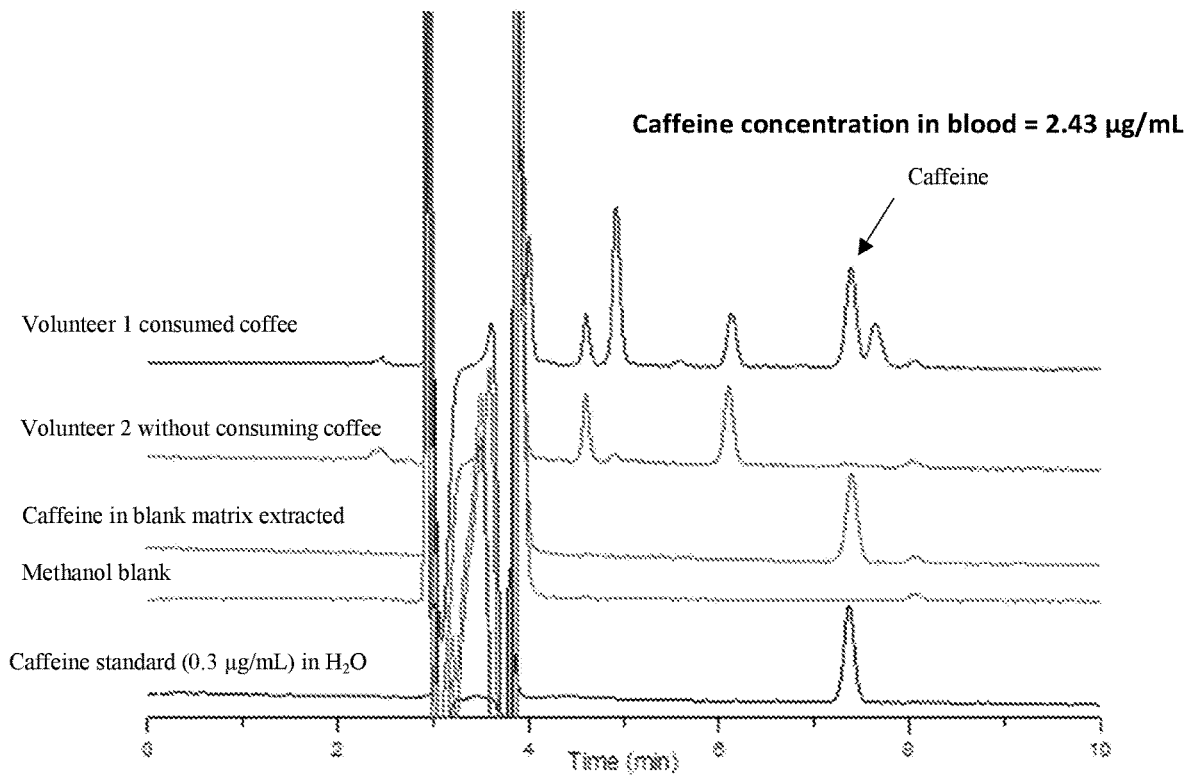

Whole blood samples were obtained from two volunteers. The whole blood of the first volunteer was obtained 3 hours after the volunteer had consumed a cup of coffee. The second volunteer had not consumed coffee for the past 24 hours. In each case, 150 µL of blood was lysed with 1350 µL of water. A solid phase extraction (SPE) procedure was conducted according to the following sequence of steps:

Precondition cartridge using 2 mL methanol and 2 mL water
Load 2 mL of samples
Wash with 9 mL water
Elute with 1 mL methanol
HPLC analysis
A 10 µL sample was injected for HPLC analysis.
The results are shown in FIG. 2.

The caffeine concentration in the blood of volunteer 1 was found to be 2.43 µg/mL. Volunteer 2 was correctly shown to have no measurable caffeine. The healthy level is 1-10 µg/mL. The lethal level is 80 µg/mL.

Example 3

To demonstrate the utility of the hydrophilic surface functionality of a porous polymer monolith with PEGMA surface graft, a 0.5 mg/mL of 3-nitroaniline sample was loaded onto porous polymer monolith 1681 (example 1) and PEGMA grafted monolith 1681. The result showed that sample solution stayed on top of unmodified monolith 1681 but was easily absorbed onto the grafted monolith 1681 without conditioning and equilibration due to the hydrophilic surface allowing the sample to transfer through the polymer.

Example 4

To demonstrate the utility of grafting of the porous polymer monolith to prepare a mixed-mode ion exchange capability, 2-Acrylamido-2-methylpropane sulfonic acid (AMPS) was used as the functional monomer for surface grafting of porous polymer monolith 1681 (example 1). In order to demonstrate the degree of grafting on the mesoporous structure of monolith 1681, amitriptyline (pka=9.4, MW=277.4) was chosen as the target analyte to investigate the binding of different AMPS-grafted 1681 monoliths.

FIG. 3 shows the increased ion exchange functionality of the increased degree of AMPS grafting. The amount of amitriptyline loaded was 100 µg and was completely bound on all samples. The original 1681 is purely hydrophobic and all adsorbed amitriptyline could be eluted with methanol. As the amount of grafted AMPS was increased the amount of amitriptyline that was retained through ionic interactions was increased too. This fraction will not desorb with methanol but requires basic elution conditions. At 3% grafting the binding capacity for amitriptyline is equally shared between the reversed phase and the ionic mode. At 10% grafting and above, the material has turned from a mixed mode sorbent to a true ion exchanger. The high recovery results demonstrate a higher degree of grafting on the mesopores compared to micropores.

The invention claimed is:

1. A porous polymer monolith comprising:
   a polymer body having macroporous through-pores that facilitate fluid flow through the body and an array of mesopores comprising hydrophobic sites, said mesopores adapted to bind from the fluid flow molecules of a predetermined range of sizes, wherein the surface area of the monolith is predominantly provided by the mesopores;
   wherein the mesopores are formed by presence of a secondary porogen during phase separation of the polymer body from a solution, the secondary porogen comprising oligomers inert with respect to the monomer and cross-linker but chemically compatible with the monomer so as to form mesostructures within the polymer body during said phase separation, wherein the secondary porogen has a molecular weight of not more than 5000;
   wherein the porous polymer monolith has a bimodal pore size distribution; and
   wherein the porous polymer monolith is surface grafted to provide a hydrophilic external surface.

2. A porous polymer monolith according to claim 1 wherein the mesopores have a pore size in the range 40-120 Å.

3. A porous polymer monolith according to claim 1 wherein the macroporous through-pores have a pore size in the range of 2-3, micron.

4. A porous polymer monolith according to claim 1, surface grafted to prepare a mixed-mode ion exchange functionality.

5. A porous polymer monolith according to claim 1 wherein greater than 65% of the surface area of the monolith is provided by the mesopores.

6. A porous polymer monolith according to claim 1 wherein at least 85% of the surface area of the monolith is provided by the mesopores.

7. A porous polymer monolith according to claim 1 wherein at least 90% of the surface area of the monolith is provided by the mesopores.

8. A porous polymer body according to claim 1, wherein the polymer body comprises styrene monomers.

9. A porous polymer body according to claim 8, wherein the polymer body consists of styrene monomers.

10. A porous polymer body according to claim 1, wherein the mesopores have a pore size in the range of 20-120 Å.

* * * * *